United States Patent Office 3,073,394
Patented Jan. 15, 1963

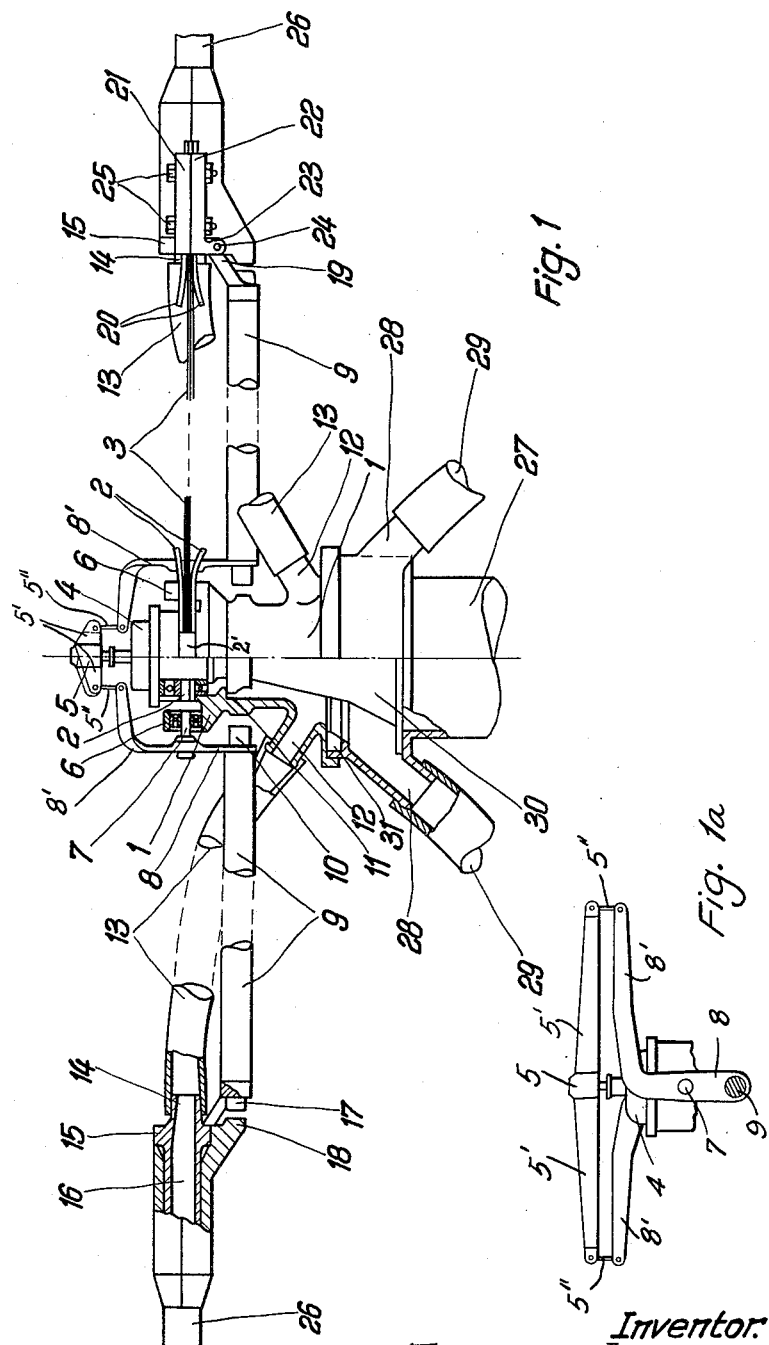

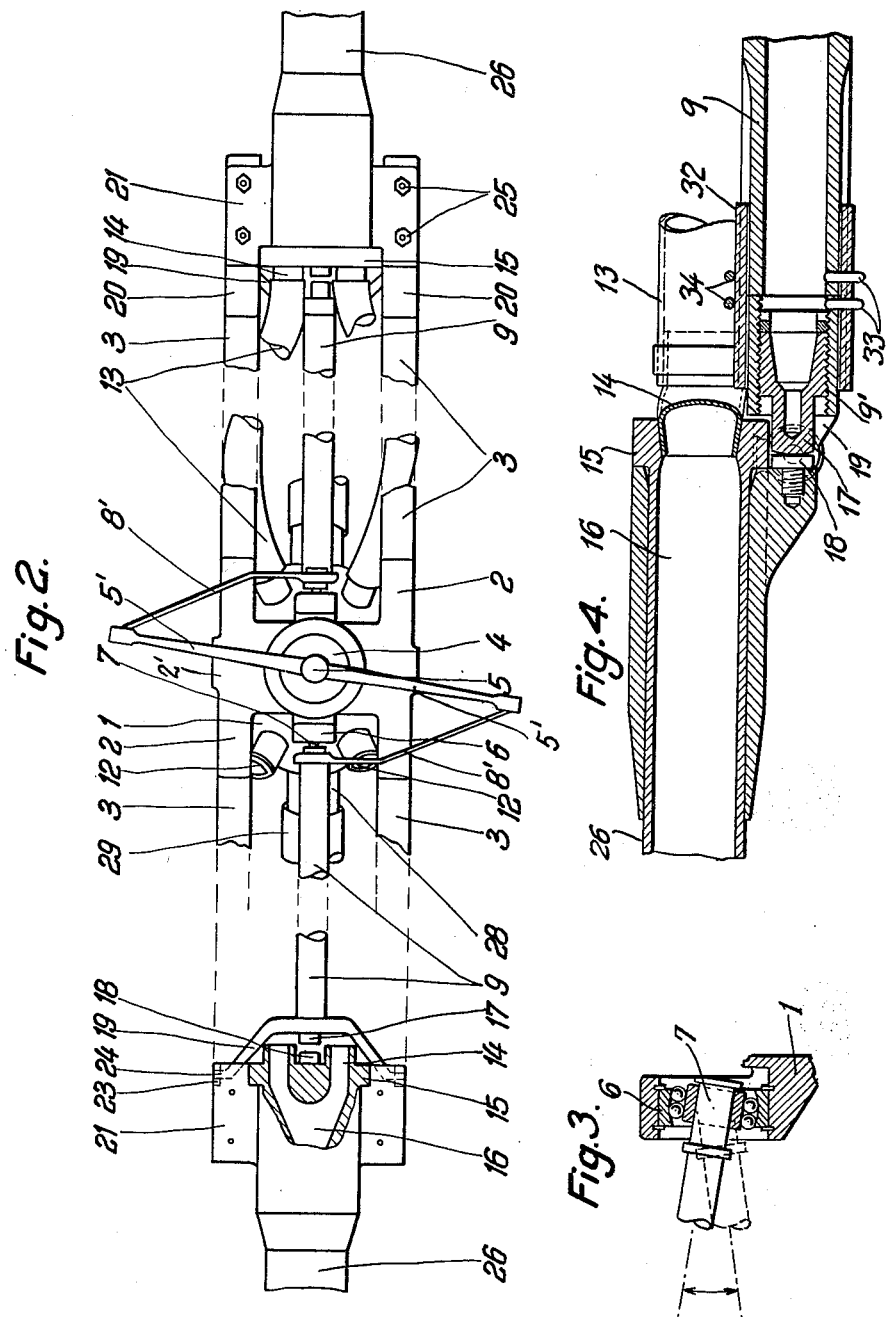

3,073,394
MOUNTING JET REACTION DRIVEN BLADES OF HELICOPTER PROPELLERS
Theodor Laufer, Friedrichshafen, Germany, assignor to Dornier-Werke G.m.b.H., Friedrichshafen, Germany, a firm
Filed Sept. 15, 1961, Ser. No. 138,511
Claims priority, application Germany Sept. 17, 1960
6 Claims. (Cl. 170—135.4)

The invention relates to the connection of the airfoils of an aircraft propeller to a rotating hub and more particularly to the connection of jet reaction driven rotor blades of a helicopter to a rotating hub.

A rigid connection of the blades of a helicopter rotor to a rotating hub is undesirable, because the air force acting on the rotor blades alternates continuously during forward flight. Therefore, a movable connection which also facilitates steering is usually provided. The conventional mechanisms include steel springs or hydraulic means for holding the rotor blades in the desired position and are complicated and expensive.

In a known arrangement a beam element is connected by a universal joint to a hub or head and carries two diametrically opposed blades which cannot be moved independently. The beam element is subjected to great bending strain and the arrangement vibrates heavily during normal flight.

Rotors which are driven by jet reaction involve the difficulty of conducting the driving gas to the tips of the blades.

If the driving gas or air is compressed by a central power unit, conducting the compressed gas to the rotor blades is difficult not only because of the rotation of the blades but also because of the movable connection of the blades to the hub.

Blade connections for reaction rotors of helicopters are known wherein the rotor blades are supported by two spring banks. The springs rest on plates at the blades and at the rotor head and absorb the centrifugal force of the blades. This arrangement requires a rotor head which is freely swingably in all directions. A movable joint must be provided for conducting the compressed air or gas to the blades. The central part of the rotor head and the movable joint are subjected to great strains produced by several simultaneously acting forces.

The object of the invention is to improve conventional supports using spring banks for jet reaction driven helicopter rotors whereby the aforedescribed difficulties are avoided and the rotor head or hub need not be swingable in all directions. The pitch-control mechanism according to the invention for adjusting the blade angle of the rotor blades includes intermediate, rigid, oblong elements which are movably supported by the rotor hub and movably connected to the rotor blades whereby the intermediate elements, which are actuated by a central steering device in the conventional manner, are subjected only to stress caused by the angular adjustment of the blades and the rigid elements including their bearings are not subjected to other stresses, for example to stresses caused by the bending moment of the rotor blades. In the device according to the invention the rotor hub is not swingable in all directions but rotates around a stationary axis. The intermediate elements are oscillatably and axially movably connected to the rotor rub by means of bearings placed substantially coaxially of the oscillation axis of the blades. The intermediate elements are swingably connected to the respective rotor blades. The gas for driving the rotor blades is directly conducted from the head or hub of the rotor to the rotor blades by means of elastic conduits which absorb the beating, swinging and torsional movements of the blades and which are rigidly connected to the hub and to the wings.

In an embodiment of the invention the aforedescribed intermediate element is used for preventing dropping of the rotor blades when the rotor is not rotated. The ends of the intermediate element abut against the hub and against the rotor blade and the spring absorbs the tension forces caused by the weight of the downwardly bent blade.

When the rotor rotates the centrifugal forces are absorbed by the springs forming part of the arrangement according to the invention and the intermediate elements forming part of the pitch-control mechanism are stressed only by the forces needed for turning the rotor blades. The intermediate element is not affected in any way by forces caused by compressed air as is the case in conventional arrangements. Bending and transverse forces acting on the intermediate elements are considerably reduced and the elements can be made considerably lighter than the intermediate elements of conventional pitch-control mechanisms. The arrangement according to the invention avoids complicated articulated connections for supplying compressed gas to the rotor blades. Due to the participation of the springs and the intermediate elements in the absorption of the forces produced during normal operation of the rotor, a satisfactorily high elasticity of the elastic compressed gas conduits forming part of the system according to the invention can be provided.

The novel features which are considered characteristic of the invention are set forth with particularity in the appended claims. The invention itself, however, and additional objects and advantages thereof will best be understood from the following description of an embodiment thereof when read in connection with the accompanying drawing wherein:

FIG. 1 is a part-sectional elevation of a schematic rotor head and blade connection according to the invention.

FIG. 1a is a side view of a portion of the mechanism shown in FIG. 1, looking in the direction of arrow A of FIG. 1.

FIG. 2 is a plan view of the rotor head and blade connection shown in FIG. 1.

FIG. 3 is a part-sectional, large scale illustration of a detail of the mechanism shown in FIGS. 1 and 2.

FIG. 4 is a part-sectional, large scale illustration showing structural details of a part of the mechanism shown in FIGS. 1 and 2.

Referring to FIGURES 1 and 2 of the drawing, numeral 26 designates rotor blades which are individually supported by means of spring banks 3 which are substantially parallel to the longitudinal axis of the rotor. Numeral 1 designates a rotor head or hub to which a pair of plates 2 are connected between which the spring banks 3 are placed. The upper plate 2 is provided in the middle with a flap 2' which is bent down and laterally confines the springs placed between the plates 2. The free ends of the upper plates 2 are bent slightly upward and the free ends of the lower plates 2 are bent slightly downward. Connection of the spring banks to the rotor blades 26 is similar to the connection of the spring banks to the rotor head, pairs of plates 20 having slightly bent free ends being provided for supporting the springs. The package comprising the plates 20 and the springs 3 therebetween is compressed between two plates 21 and 22 which are connected by bolts 25. The springs 3 extend from one rotor blade to the other. The left halves of the springs 3 are not shown in FIG. 1. The springs absorb the centrifugal forces developed by the rotor blades in the conventional manner and provide an articulation affording up and down movement of the rotor blades.

The rotor head 1 is hollow and its circumference is provided with two pairs of sockets 12, each pair pointing in the direction of a rotor blade. Elastic connecting tubes are pushed onto the sockets for conducting compressed driving gas from the rotor head to the rotor blades. The latter have spars 15 provided with sockets 14 for connecting the tubes 13. Because of the great elasticity of the tubular elements 13 the sockets 12 can be rigidly connected to or form a part of the rotor head 1 and the sockets 14 can be rigidly connected to the spars 15. No articulation of the sockets is required. The socket 14 forms part of a conduit 16 for conducting the driving gas through the spar 15 to the tip of the rotor blade. The right side of FIG. 2 clearly shows two juxtaposed tubes 13 connecting the sockets on the rotor head 1 and on the spar 15. On the left side of FIG. 2 only the sockets 12 on the rotor head 1 and the sockets 14 on the spar 15 of the rotor blade 26 are shown. The tubular connecting elements are omitted. Because of the great elasticity and length of the tubular connecting elements these elements can absorb beating, swinging and torsional movements during normal operation.

The rotor head 1 sits on a rigid tube 27 which is rigidly connected to the fuselage of the helicopter. The actuating elements for adjusting the angular position of the rotor blades are contained in the tube 27 and in a hollow conical part 30 mounted on top of the tube 27. These actuating elements are known per se and are not related to the present invention and are, therefore, not shown in detail. A portion 5 of the actuating elements protrudes through a cover 4 placed above the rotor head. The air or gas which has been compressed in a plant rigidly connected to the fuselage of the helicopter is conducted into the rotatable rotor head through two connecting tubes 29 which are made fast on sockets 28 at the top of the tube 27. Suitable ball bearings mounted on the upper part of the element 30 rotatably support the rotor head. Numeral 31 designates a seal between the rotatable rotor head 1 and the stationary tube 27.

For adjusting the angular position of the rotor blades an oblong rigid element 9 is provided for each blade which element may be formed by a tube. Each element 9 is rotatably, swingably and axially movably connected to the rotor head or hub by means of a lever 8 connected to a pin 7. The latter is supported by a bearing 6 which is mounted on the rotor head in the vicinity of the beating center. As seen in FIG. 3 the bearing permits rotation, swinging and axial movement of the pin 7 so that the element 9 can freely follow all movements occurring during normal operation without putting undue load onto the bearing 6. The levers 8 have a bent portion 8' extending from the axis of rotation of the pin 7 and forming a lever arm which is connected by a link 5'', to an arm 5' extending from the portion 5 of the actuating elements for the pitch control of the blades. For changing the pitch of the blades 26, the element 5 is moved up or down whereby the levers 8 are swung on the fulcrums formed by the pins 7. The means moving the portions 5 do not form part of the present invention and are not illustrated.

The element 9 is swingably connected to the rotor blade 26 by means of a fork 19 and pins 24 mounted at the ends of the prongs of the fork. The pins 24 extend through suitable bores into an extension 23 of the plate 21. The lever 8 is swung around the axis of the pin 7 upon actuation of the linkage 5', 8'. The lever 8 swings the element 9, effecting change of the angular position of the rotor blade by way of the fork 19. The spring banks 3 are thereby twisted.

The ends of each element 9 are provided with extensions 10 and 17 adapted to engage an abutment 11 on the rotor head and an abutment 18 on the respective rotor blade. When the rotor stands still the rotor blades 26, due to their weight, bend downward until the ends of the extensions 10 and 17 abut against the abutments 11 and 18, respectively, as shown in FIG. 4. A slight axial displacement is taken care of by the bearing 6. The bending moment of the rotor blade is transferred through the abutment 18 into the element 9. The latter is not subjected to bending stresses and transmits only axial pressure forces to the abutment 11 on the rotor head. The spring banks 3 are tensioned. The compression in the element 9 and the tension in the spring bank produce a force couple which counteracts the bending moment of the rotor blade. When the rotor rotates, the parts 17, 18 and 10, 11 are in the relative position shown in FIGURES 1 and 2 and the element 9 is entirely relieved from axial compression forces.

It is of advantage to make at least one of the elements 9 disconnectable. For example, the fork connecting the element 9 to the rotor blade may be removably connected to the element 9. As shown in FIG. 4 the end of the element 9 is splined and has a portion 9' cut off the main part of the element 9 and connected to the fork 19. The splined parts are connected by a sleeve 32 which is disconnectably connected to the parts 9 and 9' by means of pins 33 forming the ends of split, resilient rings 34. After disconnecting the element 9 the rotor blade 26 can be swung upward without difficulty and the rotor blade may be folded because it is connected to the rotor head only by means of elastic elements, namely springs and elastic tubes.

The essential advantage of the present invention is the provision of a simple rigid rotor head which is only rotatable and not movable in all directions as are conventional rotor heads. The support of the element 9 on the rotor head is relieved of all forces. There is no bending moment at the inner end of the rotor blade which is subjected only to tension stresses caused by centrifugal forces. Due to the slight stress on the inner end of the rotor blade the life of the blade is considerably extended. The same is true for the element 9 which can be made much smaller and lighter than corresponding elements of conventional arrangements. The connecting elements for conducting the compressed gas or air from the rotor head to the rotor blades are relieved substantially of all stresses and do not cause any difficulty during operation of the helicopter.

I claim:

1. Jet reaction driven helicopter rotor comprising diametrically opposed rotor blades, rotatable hub means, oblong spring banks extending substantially radially from said hub means and interconnecting said hub means and said rotor blades, said spring banks being torsionally flexible and being elastically bendable toward and from the rotation axis of said hub means, and pitch-control means for adjusting the blade angle of said rotor blades, said pitch-control means including oblong rigid intermediate elements placed substantially parallel to said spring banks, each of said intermediate elements having an end movably connected to said hub means and a second end movably connected to one of said blades for oscillating movement of said intermediate elements substantially around the longitudinal swing axes of said blades.

2. Jet reaction driven helicopter rotor as defined in claim 1 wherein said hub means is hollow, means being provided for supplying a compressed gas to the hollow of said hub means, and elastic conduits interconnecting said hub means and said rotor blades for conducting compressed gas from said hub means to said blades, said elastic conduits being placed alongside said intermediate elements.

3. Jet reaction driven helicopter rotor as defined in claim 1 including bearing means rotatably supporting said hub means to rotate around a stationary axis, means individually swingably connecting said intermediate elements with said blades for swinging on an axis substantially parallel to the plane wherein said blades rotate and tangerial to the direction of rotation of said blades, and means for swingably and axially movably connecting said intermediate elements to said hub means.

4. Jet reaction driven helicopter rotor according to claim 3 wherein the longitudinal axes of said intermediate elements are spaced from and substantially parallel to the swing axis of said means for connecting said intermediate elements to said hub means.

5. Jet reaction driven helicopter rotor according to claim 1 including abutments formed on said hub means and on said blades opposite the ends of said intermediate elements, said abutments being spaced from the respective ends of said intermediate elements when the rotor is rotating and being abutted by the respective ends of said intermediate elements when the rotor stands still and said blades bend down due to their weight and the elastic bendability of said spring banks.

6. Jet reaction driven helicopter rotor according to claim 1 wherein one of said movable connections between said ends of said intermediate elements and said blades and said hub means is disconnectable.

References Cited in the file of this patent

UNITED STATES PATENTS

| | | |
|---|---|---|
| 2,575,533 | Siebel | Nov. 20, 1951 |
| 2,845,131 | Laufer | July 29, 1958 |
| 2,994,384 | Stevens | Aug. 1, 1961 |
| 3,002,569 | Doblhoff | Oct. 3, 1961 |

FOREIGN PATENTS

| | | |
|---|---|---|
| 634,332 | Great Britain | Mar. 15, 1950 |

OTHER REFERENCES

"Aircraft Engineering," vol. 22, No. 260, October 1950, (page 293 relied on).